(12) United States Patent
Kim et al.

(10) Patent No.: US 11,976,249 B2
(45) Date of Patent: *May 7, 2024

(54) COATING COMPOSITION FOR WIPER BLADE COMPRISING GRAPHENE AND WIPER BLADE COATED USING THE SAME

(71) Applicant: CAP CORPORATION, Gyeongsangbuk-do (KR)

(72) Inventors: Ki-Young Kim, Gyeongsangbuk-do (KR); Jong-Yuen Kim, Gyeongsangbuk-do (KR)

(73) Assignee: CAP Corporation (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,384

(22) Filed: Apr. 15, 2022

(65) Prior Publication Data

US 2022/0340832 A1    Oct. 27, 2022

(30) Foreign Application Priority Data

Apr. 27, 2021 (KR) .......................... 10-2021-0054464

(51) Int. Cl.
| | | |
|---|---|---|
| *C10M 103/02* | (2006.01) | |
| *B60S 1/38* | (2006.01) | |
| *C10M 171/06* | (2006.01) | |
| *C10N 50/08* | (2006.01) | |

(52) U.S. Cl.
CPC .............. *C10M 103/02* (2013.01); *B60S 1/38* (2013.01); *C10M 171/06* (2013.01); *B60S 2001/3829* (2013.01); *C10M 2201/0413* (2013.01); *C10N 2050/08* (2013.01)

(58) Field of Classification Search
CPC .............. C10M 103/02; C10M 171/06; C10M 2201/0413; C10M 2201/041; C10M 2217/0453; B60S 1/38; B60S 2001/3829; C10N 2050/08; C10N 2020/06

See application file for complete search history.

(56) References Cited

U.S. PATENT DOCUMENTS

| | | | |
|---|---|---|---|
| 11,577,700 B2 * | 2/2023 | Kim ..................... | C09D 175/04 |
| 2006/0112512 A1 * | 6/2006 | McNeil ..................... | B60S 1/38 |
| | | | 264/105 |
| 2011/0130494 A1 * | 6/2011 | Penicaud ................ | C01B 32/22 |
| | | | 252/182.13 |

(Continued)

FOREIGN PATENT DOCUMENTS

| | | |
|---|---|---|
| JP | 4502591 | 7/2010 |
| JP | 2020510121 | 4/2020 |
| KR | 20080033759 | 4/2008 |

OTHER PUBLICATIONS

Office Action from related Korean Appln. No. 10-2021-0054464 dated Oct. 13, 2021. English translation attached 4 pages.

*Primary Examiner* — Ellen M McAvoy
(74) *Attorney, Agent, or Firm* — Grossman, Tucker, Perreault & Pfleger, PLLC

(57) ABSTRACT

The present disclosure relates to a coating composition for a wiper blade comprising graphene and a wiper blade coated using the same. More particularly, the present disclosure relates to a coating composition for a wiper blade comprising graphene that may improve durability, an abrasion resistance, and a slip property of a wiper blade, a wiper blade coated using the coating composition, and a method for manufacturing the wiper blade.

13 Claims, 5 Drawing Sheets

(56) References Cited

U.S. PATENT DOCUMENTS

| | | | |
|---|---|---|---|
| 2013/0015409 A1* | 1/2013 | Fugetsu | F16D 69/026 977/734 |
| 2014/0134092 A1* | 5/2014 | Shankman | B82Y 30/00 423/448 |
| 2016/0060124 A1* | 3/2016 | Schneider | C01B 32/194 427/337 |
| 2018/0250704 A1* | 9/2018 | Truica-Marasescu | C01B 32/184 |
| 2021/0179027 A1* | 6/2021 | Dellock | B60S 1/3805 |
| 2022/0220407 A1* | 7/2022 | Kim | C10M 159/00 |
| 2022/0339697 A1* | 10/2022 | Jansson | C01B 32/194 |
| 2022/0340832 A1* | 10/2022 | Kim | C10M 169/04 |

* cited by examiner

Evaluation Reference Table for Initial Wiping

| Blade Wiped state | Grade | Blade Wiped state | Grade |
|---|---|---|---|
| | 10 | | |
| | 9 | | 5 |
| | 8 | | |
| | | | 4 |
| | 7 | | 3 |
| | | | |
| | 6 | | 2 |
| | | | 1 |

FIG. 5

COATING COMPOSITION FOR WIPER BLADE COMPRISING GRAPHENE AND WIPER BLADE COATED USING THE SAME

CROSS REFERENCE TO RELATED APPLICATION

This application claims the benefit of Korean Patent Application No. 10-2021-0054464, filed on Apr. 27, 2021, entitled "Coating composition for wiper blade comprising graphene and wiper blade coated using the same", which is hereby incorporated by reference in its entirety into this application.

BACKGROUND

1. Field

The present disclosure relates to a coating composition for a wiper blade comprising graphene and a wiper blade coated using the same. More particularly, the present disclosure relates to a coating composition for a wiper blade comprising graphene that may improve durability, an abrasion resistance, and a slip property of a wiper blade, a wiper blade coated using the coating composition, and a method for manufacturing the wiper blade.

2. Description of Related Art

Wiper blades serve to remove moisture or particulates attached to a smooth surface of a windshield or the like of transportation equipment such as a vehicle, an aircraft, or a ship or industrial machinery such as construction machinery. In general, the wiper blade is designed to operate at an angle of about 30° to 50° with the windshield.

Wiper blade rubber is mounted in a sliding portion of a wiper. For example, in a windshield wiper for a vehicle, rain, snow, dust, mud, and the like attached to a glass surface are removed by an operation of the wiper blade rubber as the wiper is driven.

However, in a case where the wiper blade has a high contact pressure, noise and abrasion of rubber occur, whereas in a case where the wiper blade has a low contact pressure, foreign substances cannot be properly wiped off, which may cause functional problems of the wiper blade.

Therefore, in relation to improvement of the characteristics of the wiper blade, there is a need to improve characteristics of a wiper blade that has an improved slip property while maintaining a proper contact pressure, and has both improved wiping durability and abrasion resistance for evenly wiping off foreign substances.

In order to improve the characteristics of the wiper blade, although components and component ratios of a coating composition for a wiper blade have been changed, graphite has been mainly used as a solid lubricant in the coating composition for a wiper blade according to the related art. Therefore, there was a limit to improving the slip property, the durability, and the abrasion resistance of the wiper blade at the same time using the coating composition.

As a background art of the present disclosure, Japanese Patent No. 4,502,591 discloses a technique related to wiper blade rubber.

SUMMARY

An object of the present disclosure is to provide a coating composition for a wiper blade comprising graphene that may improve a slip property, durability, and an abrasion resistance of a wiper blade at the same time.

Another object of the present disclosure is to provide a wiper blade having a slip property, durability, and an abrasion resistance improved at the same time using the coating composition for a wiper blade.

Other objects and advantages of the present disclosure will be more apparent by the following detailed description, the claims, and the drawings.

According to an aspect, there is provided a coating composition for a wiper blade comprising graphene, the coating composition comprising a solid lubricant comprising one or more types of graphene selected from graphene oxide and reduced graphene oxide (hereinafter, referred to as reduced graphene).

According to an embodiment, a size of the graphene may be 50 μm or less.

According to an embodiment, an average thickness of the graphene may be 0.5 nm to 100 nm.

According to an embodiment, the average thickness of the graphene may be 50 nm to 100 nm.

According to an embodiment, a weight ratio of the reduced graphene to the graphene oxide may be 1:0 to 1:4.

According to an embodiment, the solid lubricant may comprise reduced graphene.

According to an embodiment, the reduced graphene may be a powder form.

According to an embodiment, the coating composition may comprise, based on 100 parts by weight of the coating composition for a wiper blade: 1 to 16 parts by weight of a solid lubricant; 1 to 10 parts by weight of a binder; and 80 to 90 parts by weight of an organic solvent.

According to an embodiment, the coating composition may improve a slip property, an abrasion resistance, and durability of rubber of a wiper blade at the same time in comparison to a coating composition for a wiper blade that does not comprise graphene.

According to another aspect, there is provided a wiper blade coated with the coating composition for a wiper blade comprising graphene of the present disclosure.

According to still another aspect, there is provided a method for manufacturing a wiper blade, the method including coating the coating composition for a wiper blade comprising graphene of the present disclosure on a wiper blade.

According to an embodiment, one or more of graphene oxide and reduced graphene are included as the solid lubricant, such that the abrasion resistance and the durability of the rubber of the wiper blade may be improved at the same time, and a rubber contact life of the wiper blade may be increased.

According to an embodiment, one or more of graphene oxide and reduced graphene are included as the solid lubricant, such that the slip property may be improved by a decrease in coefficient of friction, and the effect of reducing noise and vibrations may be achieved.

According to an embodiment, the slip property, the abrasion resistance, and the durability of the rubber of the wiper blade may be further improved by adjusting the size and/or the thickness of each of the graphene oxide and the reduced graphene.

BRIEF DESCRIPTION OF THE DRAWINGS

FIG. 5 illustrates an evaluation reference table for initial wiping.

DETAILED DESCRIPTION OF THE DISCLOSURE

Figure 1:
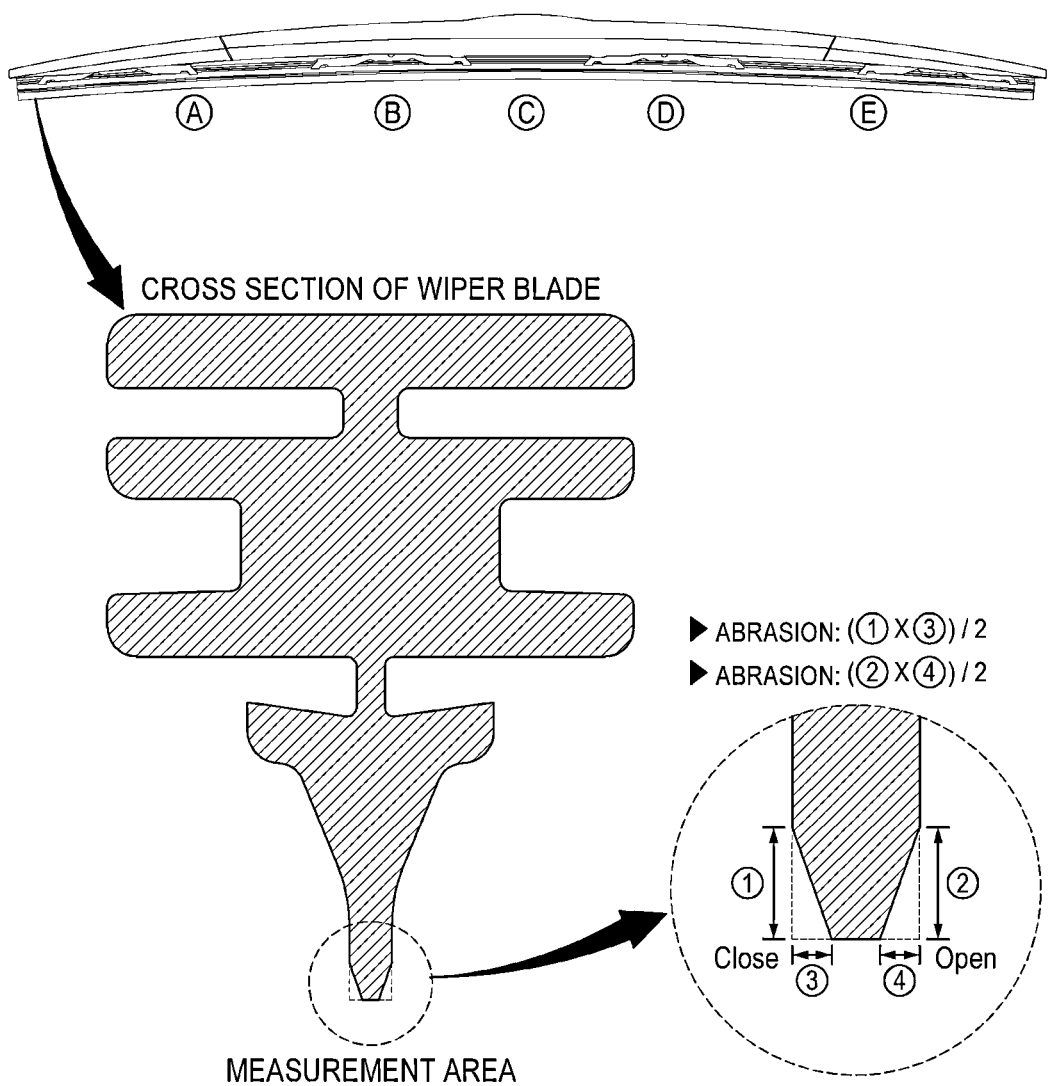
FIG. 1 is a view illustrating a method of measuring a wiper blade when measuring an abrasion resistance according to the present disclosure.

The present disclosure may be variously modified and have several embodiments. Therefore, specific embodiments of the present disclosure will be described in detail. However, it is to be understood that the present disclosure is not limited to the specific embodiments, but includes all modifications, equivalents, and substitutions included in the spirit and the scope of the present disclosure. When it is determined that a detailed description for any known art related to the present disclosure may obscure the gist of the present disclosure, the detailed description will be omitted.

In order that the present disclosure may be more readily understood, certain terms are defined in the present disclosure for convenience. Unless otherwise defined in the present disclosure, the scientific and technical terms used in the present disclosure will have the meanings generally understood by those skilled in the art. Unless explicitly described otherwise, the term "comprising" used herein means that other elements are not excluded and may be further included.

Hereinafter, the present disclosure will be described in more detail with reference to embodiments. These embodiments are only for explaining the present disclosure in more detail. According to the gist of the present disclosure, it will be apparent to those skilled in the art that the scope of the present disclosure is not limited by these embodiments.

According to an aspect, there is provided a coating composition for a wiper blade comprising graphene, the coating composition comprising a solid lubricant comprising one or more types of graphene selected from graphene oxide and reduced graphene.

The coating composition for a wiper blade according to the present disclosure comprises graphene included in the solid lubricant.

Graphene is a term created by combining graphite with "ene", which is a suffix having the meaning of a molecule with a carbon-carbon double bond, and refers to a single graphite layer named in the study on a graphite interlayer material. Graphene has a honeycomb-like planar structure in which carbon atoms form a hexagonal lattice, a thickness is 0.34 nm, and the carbon atoms are connected by sp 2 hybrid orbitals and are conjugated, and thus exists in a stable structure.

Due to the structure as described above, graphene has characteristics such as a high strength, a thermal conductivity, a charge mobility, transparency, a surface area, and flexibility.

More specifically, graphene has a strength of 1,100 GPa that is about 200 times the strength of steel, a thermal conductivity of 5,000 W/m·k that is about 2 times the thermal conductivity of diamond, a charge mobility of 200,000 $cm^2$/V·sec that is about 100 times or more the charge mobility of silicon, and a transmittance of 97%/1 layer to 98%/1 layer that is 80% or more of the transmittance of indium tin oxide (ITO). In addition, graphene has a high surface area of 2,130 $m^2$/g and has flexibility to maintain intrinsic properties even when being bent or stretched.

Since graphene has the characteristics such as a high strength, a thermal conductivity, a charge mobility, transparency, a surface area, and flexibility as described above, graphene has been applied to technologies such as a transparent electrode, a composite material, a heat dissipation material, a printed electronic material, a barrier, an energy electrode, a next-generation semiconductor, a nanocomposite additive, a large capacity storage battery, and a hydrogen storage device.

However, it is not known that graphene is applied as a solid lubricant for a coating composition for a wiper blade.

In the present disclosure, focusing on high elasticity and high strength properties of graphene, in order to improve characteristics of a wiper blade, graphene is applied as a solid lubricant in the coating composition for a wiper blade. More specifically, the graphene may have a tensile strength of 20 GPa or more and an elongation of 20% or more. When a coating composition for a wiper blade comprising the graphene included in a solid lubricant is prepared, smooth operability between rubber and a coating surface of a wiper blade to which this coating composition is applied may be maintained, and a smooth and uniform coating surface may be formed and maintained on a surface of the wiper blade, such that a coefficient of friction may be decreased, thereby improving a slip property and a noise and vibration prevention performance. In addition, when the graphene is used as a solid lubricant, a coating surface having a high strength is formed on the surface of the wiper blade, such that an abrasion resistance and durability of blade rubber may be improved at the same time, and a life of the wiper blade may be extended.

Figure 2:
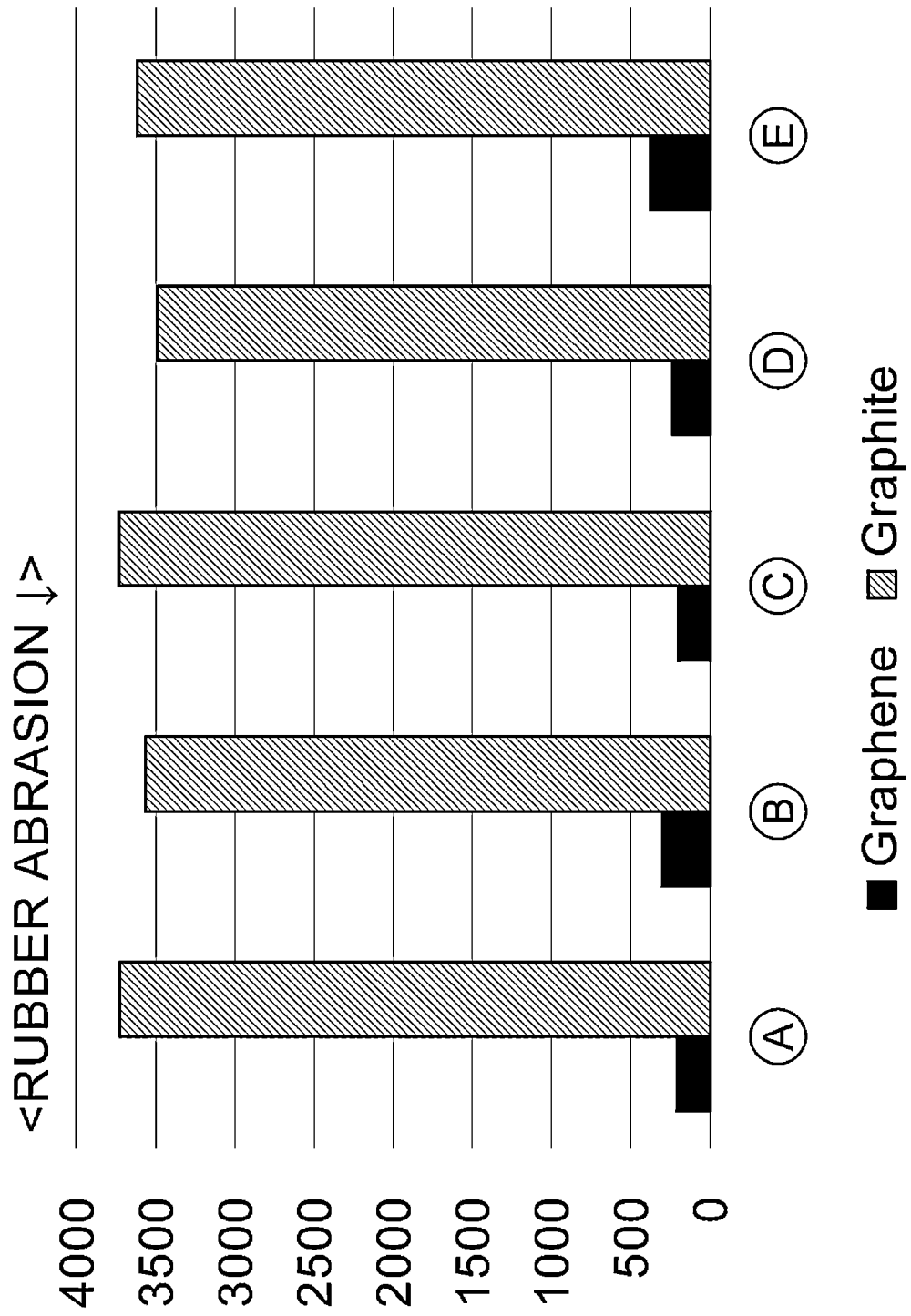
FIG. 2 is a graph showing rubber abrasion of graphene and graphite.

FIG. 1 is a view illustrating a method of measuring a wiper blade when measuring an abrasion resistance according to the present disclosure, and FIG. 2 is a graph showing rubber abrasion of graphene and graphite. In the related art, graphite has been mainly used as a solid lubricant in a composition for a wiper blade.

Referring to FIG. 2, it can be seen that rubber abrasion of graphene is significantly lower than that of graphite. In addition, the coating composition for a wiper blade comprising graphene of the present disclosure may improve a rubber abrasion resistance of a wiper blade, such that a rubber line contact life may be increased and durability may be improved.

Figure 3:
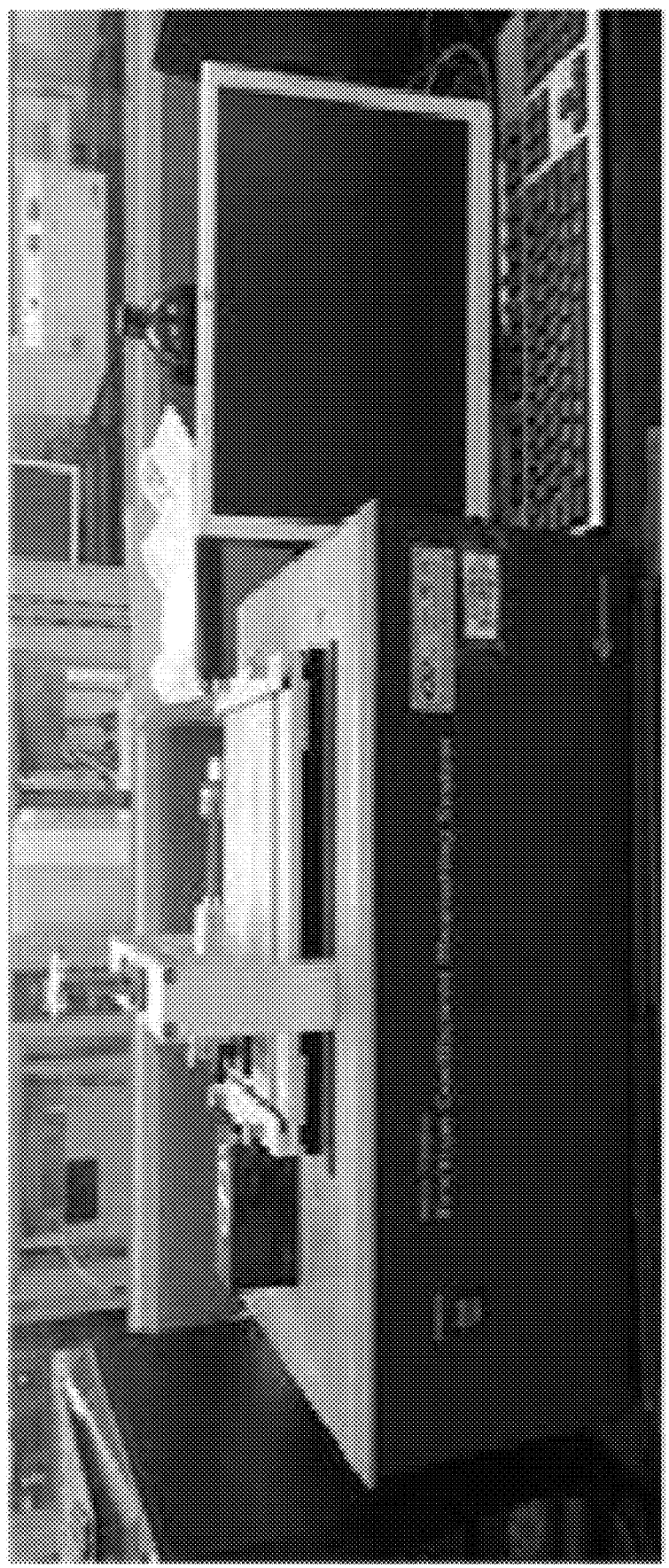
FIG. 3 is a photograph of a system for measuring a coefficient of friction when coating a coating composition for a wiper blade comprising graphene according to the present disclosure.
Figure 4:
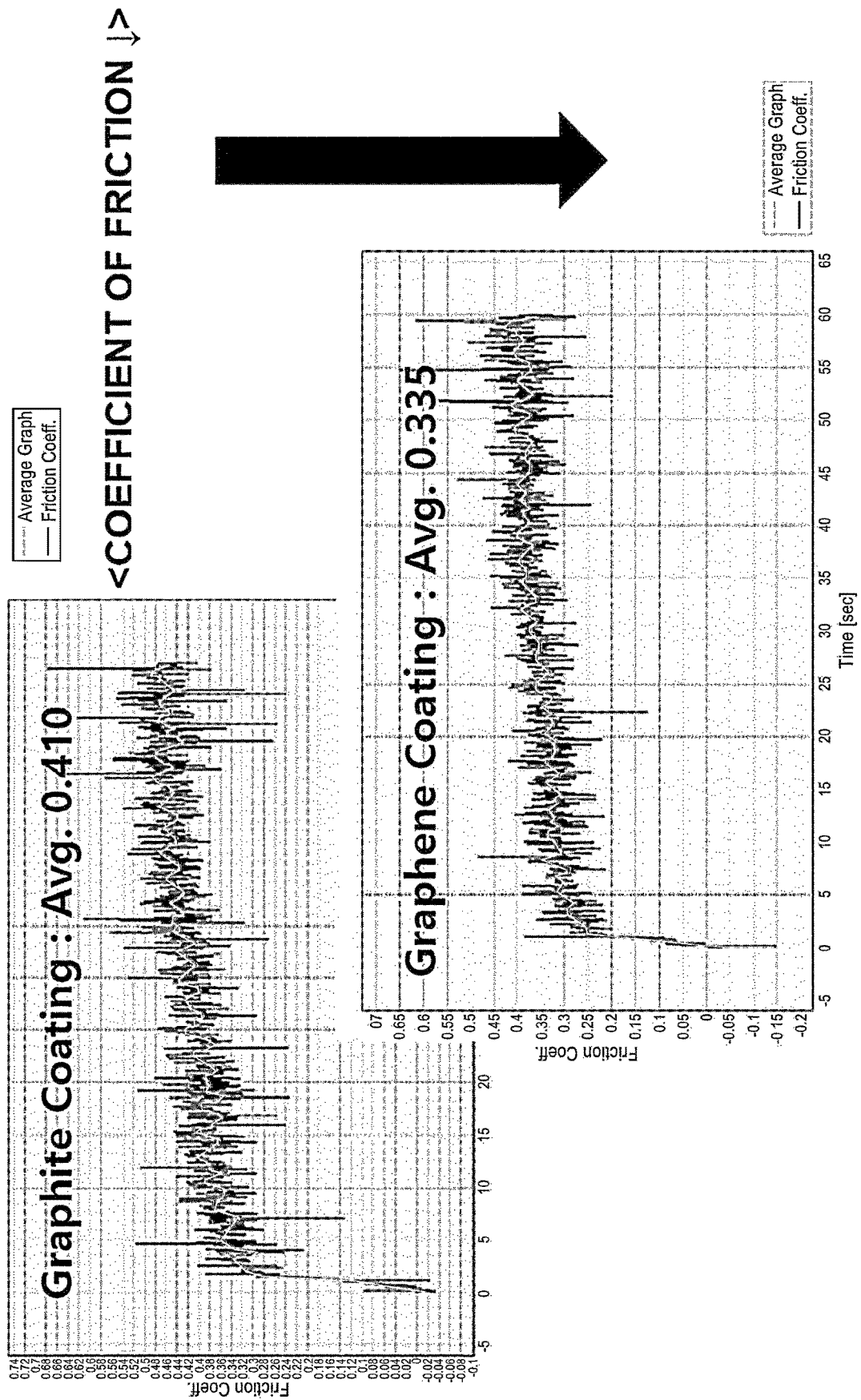
FIG. 4 is a view illustrating a comparison of graphs showing coefficients of friction of graphene and graphite.

FIG. 3 is a photograph of a system for measuring a coefficient of friction when coating the coating composition for a wiper blade comprising graphene according to the present disclosure, and FIG. 4 is a view illustrating a comparison of graphs showing coefficients of friction of graphene and graphite.

Referring to FIG. 4, graphite coating exhibits an average coefficient of friction of 0.410, and graphene coating exhibits an average coefficient of friction of 0.335. Therefore, it can be confirmed that the coefficient of friction of the graphene coating is lower than the coefficient of friction of the graphite coating, and it is possible to improve the slip property of the wiper blade by a decrease in coefficient of friction of the graphene and to achieve the effect of reducing noise and vibrations.

Although not limited thereto, the graphene may be preferably included in an amount of 10 to 100 parts by weight based on the total weight of the solid lubricant in terms of improving the abrasion resistance and the slip property of the wiper blade, and the graphene may be more preferably included in an amount of 50 to 100 parts by weight and still more preferably included in an amount of 70 to 100 parts by weight based on the total weight of the solid lubricant. When the content of the graphene is less than 10 parts by weight based on the total weight of the solid lubricant, the effect of improving the slip property, the abrasion resistance, and the durability may be insignificant.

In the present disclosure, as the graphene, graphene oxide or reduced graphene may be used alone, or a mixture of graphene oxide and reduced graphene may be used. In general, although not limited thereto, the graphene oxide may be a solution form. The graphene oxide is a material in which graphene is oxidized and is a form in which carbon particles are oxidized by an acid. The graphene oxide may be produced by oxidizing common graphite with a strong acid such as sulfuric acid. In some cases, a material in which sulfuric acid is mixed with hydrogen peroxide may be used for oxidation. The reduced graphene may be produced in a powder form by reducing graphene oxide, and the powdered reduced graphene may be used for various types of manufacturing. The graphene oxide and the reduced graphene may be suitable for mass production.

Although not limited thereto, a size of the graphene may be preferably 50 µm or less in terms of improving the characteristics such as the durability, the abrasion resistance, and the slip property (decrease in coefficient of friction) of the wiper blade, in particular, improving the abrasion resistance, and the size of the graphene may be more preferably 40 µm or less, still more preferably 30 µm or less, still more preferably 20 µm or less, still more preferably 15 µm or less, still more preferably 10 µm or less, and still more preferably 5 µm or less. Furthermore, when the graphene has a uniform size, as a thickness of the graphene is smaller, the characteristics such as the durability, the abrasion resistance, and the slip property (decrease in coefficient of friction) of the wiper blade may be preferably improved, and in particular, the abrasion resistance may be preferably improved. Here, the size of the graphene refers to a distance or length from one end of the graphene to the other end of the graphene.

Although not limited thereto, an average thickness of the graphene may be preferably 0.5 nm to 100 nm in terms of improving the durability, the abrasion resistance, and the slip property (decrease in coefficient of friction) of the wiper blade, in particular, improving the abrasion resistance, and the average thickness of the graphene may be more preferably 50 nm to 100 nm. Although not limited thereto, when the average thickness of the graphene is less than 0.5 nm, the effect of improving the abrasion resistance, the slip property, and the durability may be insignificant. Furthermore, when the average thickness of the graphene is within the same range, as the size of the graphene is smaller, the characteristics such as the durability, the abrasion resistance, and the slip property (decrease in coefficient of friction) of the wiper blade may be preferably improved, and in particular, the abrasion resistance may be preferably improved.

Although not limited thereto, a weight ratio of the reduced graphene to the graphene oxide is preferably 1:0 to 1:4 in terms of improving the abrasion resistance. In the case of the coating composition having the composition in the above range, a wiping durability grade (200,000 cycles) of the wiper blade is 8/8, which shows that the wiping durability grade of the wiper blade is excellent. Since the abrasion is 1,582 to 1,644 and the coefficient of friction is 0.378 to 0.381, the slip property may be improved by a decrease in coefficient of friction, the effect of reducing noise and vibrations may be achieved, and the durability and the abrasion resistance may be preferably improved (Examples 1 to of [Table 4]).

Although not limited thereto, the solid lubricant may comprise reduced graphene. In a case where the solid lubricant does not comprise graphene oxide and comprises reduced graphene, since the wiping durability grade (200,000 cycles) is 8/8 to 9/9, the abrasion is 807 to 2,031, and the coefficient of friction is 0.335 to 0.380, the slip property may be improved by a decrease in coefficient of friction, the effect of reducing noise and vibrations may be achieved, and the durability and the abrasion resistance may be more preferably improved (Examples 6 to 11 of [Table 5]).

Although not limited thereto, the reduced graphene may be a powder form. The reduced graphene may be produced by drying graphene oxide in a solution form to obtain a graphene oxide powder, and then reducing the graphene oxide powder using a vaporized reducing agent. The powdered reduced graphene may be suitable for preparing a coating composition for a wiper blade.

Although not limited thereto, a size of the reduced graphene may be preferably 40 µm or less in terms of improving the characteristics such as the durability, the abrasion resistance, and the slip property (decrease in coefficient of friction) of the wiper blade, in particular, improving the abrasion resistance, and the size of the reduced graphene may be more preferably 30 µm or less, still more preferably 20 µm or less, still more preferably 15 µm or less, still more preferably 10 µm or less, and still more preferably 5 µm or less. Furthermore, when the reduced graphene has a uniform size, as a thickness of the graphene is smaller, the characteristics such as the durability, the abrasion resistance, and the slip property (decrease in coefficient of friction) of the wiper blade may be preferably improved, and in particular, the abrasion resistance may be preferably improved. Although not limited thereto, when the size of the reduced graphene is less than 5 µm and the average thickness of the reduced graphene is 50 nm to 100 nm, since the wiping durability grade (200,000 cycles) is 9/9, the abrasion is 807, and the coefficient of friction is 0.335, all of the durability, the abrasion resistance, and the slip property are most excellent (Example 7).

The graphene of the present disclosure may be produced by various known production methods.

The production method of graphene may be broadly divided into a top-down method in which graphene is produced by exfoliating graphite, and a bottom-up method in which graphene is obtained by bonding carbon atoms one by one and growing the carbon atoms in a plane. In general, the graphene produced by the bottom-up method may have a higher purity and no defects in comparison to the graphene produced by the top-down method. High-purity graphene in which all carbon atoms are connected by covalent bonds may be obtained by the bottom-up method. However, the bottom-up method has disadvantages in that a process is complicated and a high cost is required.

Examples of the top-down method include a mechanical exfoliation method and a chemical exfoliation method. The mechanical exfoliation method is a method of exfoliating graphene by applying a physical force between graphene layers, and typical examples thereof include a method of exfoliating graphene using a scanning probe microscope (SPM) and a method using a cellophane tape.

The method using a cellophane tape was used for the first discovery of graphene. When a cellophane tape is attached to and detached from graphite, a graphite layer is separated by an adhesive force of the tape. In this case, since the separated graphite is composed of several layers, it is required to repeatedly attach and detach the tape to obtain a single layer of graphene. After this operation, an adhesive material of the cellophane tape is removed using an organic solvent, and finally, a single layer of graphene may be obtained. The graphene obtained by this method has few defects and has excellent properties, but it is difficult to control the number of layers and mass production of graphene may be very difficult.

In the chemical exfoliation method, graphene oxide is produced and the graphene oxide is subjected to a reduction process, thereby obtaining graphene. By forming an oxygen functional group between graphene layers using an acid, graphene oxide in which a distance between graphene layers is increased may be produced. As a surface of the graphene is oxidized, graphene is easily dispersed in an organic solvent. The graphene oxide dispersed in the solvent is subjected to a washing and drying process to obtain graphene oxide, or is produced into reduced graphene using a reducing agent.

Specifically, the chemical exfoliation method is a method of producing an interlayer oxide of graphite using a strong acid and finally separating graphene from the interlayer oxide. Graphite oxidized by a strong acid such as sulfuric acid has strong hydrophilicity and attracts water molecules between the layers. As such, when the water molecules enter between the layers, a distance between the layers of graphite oxide is increased, and in this state, when a mechanical shock such as ultrasonic waves is applied, the layers are easily separated. Graphene separated into a single layer from the graphite oxide is called graphene oxide (GO). However, since the graphene oxide exhibits electrical properties different from those of graphene due to defects caused by oxidation, a process of reducing the graphene oxide again is performed, and then, graphene in the form of reduced graphene oxide (rGO) may be finally obtained. Examples of the reduction process include a method using a reducing agent such as hydrazine, a method of exposing graphene oxide to hydrogen plasma, a method using a laser, and a method of reducing graphene oxide using heat. Although the reduced graphene oxide (rGO) produced by the above method may be mass-produced at a relatively low cost, the reduced graphene oxide (rGO) contains a large amount of impurities and includes a large number of multi-layers of graphene rather than a single layer of graphene, which may be limited in its application fields.

However, when a redox method is adopted among the chemical exfoliation methods, graphene oxide (GO) is obtained, and functional groups such as —O, —OH, —COO, and —COOH are present on a surface of the obtained graphene oxide. Therefore, dispersibility of the graphene oxide may be excellent, and electrical and mechanical properties may be improved through a reaction with a polymer or a nanometal material.

Meanwhile, a mass production technology using a typical chemical vapor deposition (CVD) method of the bottom-up method has also been reported.

The chemical vapor deposition method is a method that may industrially mass produce high quality graphene at present, in which when a gaseous hydrocarbon such as methane is used as a carbon source and flows on a copper foil at a high temperature together with hydrogen and argon, graphene is synthesized on the metal as a catalyst. With this method, graphene having desired structure and properties may be synthesized by controlling the type of catalyst metal and the type and ratio of carbon source. In addition, it is easy to synthesize graphene in a large area, but a transfer process to a desired substrate is required for actual use after being synthesized on a metal substrate.

In a method of producing graphene by an epitaxial growth method, a single crystal substrate such as a silicon carbide (SiC) single crystal substrate is used for epitaxial growth of graphene. When the SiC single crystal substrate is heated to a high temperature of 1,300° C. or higher for growth of graphene, silicon in the SiC crystal is sublimed, carbon atoms are rearranged at the site where the silicon atoms are sublimed, and graphene is formed. Graphene produced on a commercial substrate does not require a separate transfer process, but an expensive and high-quality SiC substrate should be used, and defects in the substrate may directly lead to defects in graphene.

Although not limited thereto, the coating composition for a wiper blade comprising graphene of the present disclosure may comprise, based on 100 parts by weight of the coating composition for a wiper blade: 1 to 16 parts by weight of a solid lubricant; 1 to 10 parts by weight of a binder; and 80 to 90 parts by weight of an organic solvent.

Although not limited thereto, the solid lubricant may be preferably included in an amount of 1 to 16 parts by weight based on 100 parts by weight of the coating composition for a wiper blade in terms of improving the slip property, the abrasion resistance, and the durability, and the solid lubricant may be more preferably included in an amount of 6 to 16 parts by weight based on 100 parts by weight of the coating composition for a wiper blade. Although not limited thereto, when the content of the solid lubricant is less than 1 part by weight, the durability may be deteriorated, and when the content of the solid lubricant is more than 16 parts by weight, strength of a coating film of the wiper blade may be lowered and lubricating durability may be thus deteriorated.

Although not limited thereto, the solid lubricant may further comprise one or more selected from silicone powder, Teflon powder, PE (Polyethylene) powder, and a pigment. The silicone powder, which is flexible powder having a significantly excellent slip property, is an elastic material in which dimethyl silicone is cross-linked, and may provide lubricity and smoothness in the coating composition for a wiper blade comprising graphene and may provide chattering stability. The Teflon powder is known to have excellent chemical resistance among organic materials, and may improve resistance to friction generated between glass and rubber for a wiper while providing high durability against influences of bad weather, aging, chemicals, and temperature.

The binder may be, but is not limited to, a silicone-based binder, a polyurethane resin, a cellulose resin, a polyamide resin, a polyester resin, or an epoxy resin, and a polyurethane resin may be preferable. Polyurethane is a synthetic polymer compound produced by a polyaddition reaction by which urethane linkages are repeatedly formed by diisocyanate and dialcohol, and has the urethane linkages inside a main chain. The polyurethane resin is easy to use and has an excellent abrasion resistance, flatness, plastering properties, flexibility, and adhesion.

The binder may be preferably included in an amount of 1 to 10 parts by weight based on 100 parts by weight of the coating composition for a wiper blade in terms of improving the durability and/or the abrasion resistance of the wiper blade, and the binder may be more preferably included in an amount of 3 to 8 parts by weight based on 100 parts by weight of the coating composition for a wiper blade. Although not limited thereto, when the content of the binder in the coating composition is less than 1 part by weight, it is difficult to obtain a sufficient abrasion resistance, and when the binder is included in a large amount of more than 10 parts by weight, streaks and noise may easily occur due to marks generated after wiping with the wiper blade. In addition, when the binder is included in the coating composition in a large amount of more than 10 parts by weight, the solid lubricant is included in a relatively small amount. Therefore, when sand is attached to the wiper blade, the coefficient of friction is rapidly increased, which may cause deterioration of sliding properties.

The organic solvent is not particularly limited as long as it may dissolve a binder, and a known organic solvent may be used. Although not limited thereto, toluene, methyl ethyl ketone, xylene, ethyl acetate, butyl acetate, ethanol, and a mixture thereof may be used as the organic solvent. As a solvent for dissolving and diluting a binder, solvents that completely dissolve a binder may be used alone or in combination of two or more thereof.

The organic solvent is preferably included in an amount of 80 to 90 parts by weight based on 100 parts by weight of the coating composition for a wiper blade in terms of improving the durability and/or the abrasion resistance of the wiper blade.

Although not limited thereto, the coating composition for a wiper blade of the present disclosure may further comprise one or more additives. The additives may be additives such as a dispersing agent, a defoaming agent, a leveling agent, an emulsifier, an ultraviolet absorber, and an anti-settling agent. In addition, the additive may further include a filler such as kaolin, talc, silica, calcium carbonate, mica, titanium dioxide, alumina, urethane rubber powder, or acrylic powder. The dispersing agent and the anti-settling agent among the additives may be preferably included in an amount of 0.5 to 3 parts by weight based on 100 parts by weight of the coating composition for a wiper blade in terms of improving the wiping durability and the abrasion resistance of the wiper blade.

For the above reasons, the coating composition for a wiper blade of the present disclosure may improve the slip property, the abrasion resistance, and the durability of the rubber of the wiper blade at the same time, and in particular, may significantly improve the abrasion resistance, in comparison to a coating composition for a wiper blade that does not comprise graphene. In comparison to Comparative Example 1 in which the coating composition does not comprise graphene and comprises graphite, in Examples 1 to 11, a high wiping durability grade, a low abrasion, and a low coefficient of friction are exhibited. Therefore, the coating composition for a wiper blade comprising graphene may improve the slip property, the abrasion resistance, and the durability of the rubber of the wiper blade at the same time, in particular, may significantly improve the abrasion resistance, and may improve the slip property by a decrease in coefficient of friction and may achieve the effect of reducing noise and vibrations.

According to another aspect, there is provided a wiper blade coated with the coating composition for a wiper blade comprising graphene of the present disclosure.

The wiper blade of the present disclosure may be formed of silicon rubber or general rubber. The general rubber may be composed of, but is not limited to, one or more of natural rubber, butadiene rubber, styrene-butadiene rubber, EPDM rubber, and chloroprene rubber. A material of the wiper blade of the present disclosure is not particularly limited as long as it satisfies required performances such as adhesion to rubber and conformability to rubber extensibility, and materials may be used alone or in combination of two or more thereof.

In the wiper blade coated with the coating composition for a wiper blade comprising graphene of the present disclosure, an abrasion resistance and durability of rubber of the wiper blade may be improved and a rubber contact life of the wiper blade may be increased. In addition, the wiper blade may improve the slip property by a decrease in coefficient of friction and may achieve the effect of reducing noise and vibrations.

The coating composition for a wiper blade comprising graphene of the present disclosure may be used for at least one of a hose, a cable plug, a traction cable, and an external cable, in addition to the wiper blade.

According to still another aspect, there is provided a method for manufacturing a wiper blade, the method including coating the coating composition for a wiper blade comprising graphene of the present disclosure on a wiper blade.

The coating of the coating composition for a wiper blade comprising graphene on the wiper blade may be performed by a known coating method, for example, a spraying method or a dipping method.

When the coating is performed by the spraying method, coating equipment is relatively simple, a continuous process is preferably performed, and a more uniform coating surface is formed, in comparison to the coating performed by the dipping method, but the amount of coating liquid consumed is large and the coating liquid is scattered.

In the embodiments of the present disclosure, the coating composition of the present disclosure is sprayed onto a surface of wiper blade rubber with a spray gun at a constant height, speed, and spray amount, and then, a coating film is cured through thermal curing (by a drying furnace) at room temperature.

Hereinafter, the present disclosure will be described in detail with reference to examples. However, the following examples illustrate only the present disclosure, and the present disclosure is not limited by the following examples.

EXAMPLES

1. Preparation of Coating Composition for Wiper Blade Comprising One or More of Graphene Oxide and Reduced Graphene Coating compositions for a wiper blade of Comparative Example 1 and Examples 1 to 5 were prepared as follows according to the compositions shown in Table 1. The unit of the component content shown in Table 1 is g for the binder and the solid lubricant and is ml for the organic solvent. Here, the size of the graphene refers to a distance or length (μm) from one end of the graphene to the other end of the graphene.

1-1. Coating Composition of Comparative Example 1

A coating composition for a wiper blade of Comparative Example 1 was prepared by mixing and dispersing 15 g of a polyurethane resin, 200 ml of toluene, and 20 g of graphite having a size of 2.5 μm as a solid lubricant. In Comparative Example 1, graphene was not included.

1-2. Coating Composition of Example 1

A coating composition for a wiper blade of Example 1 was prepared by mixing and dispersing 15 g of a polyurethane resin, 200 ml of toluene, and 20 g of graphene oxide having a size of less than 10 μm and an average thickness of 50 nm to 100 nm as a solid lubricant. In Example 1, graphite and reduced graphene were not included.

1-3. Coating Composition of Example 2

A coating composition for a wiper blade of Example 2 was prepared by mixing and dispersing 15 g of a polyurethane resin, 200 ml of toluene, and 20 g of reduced graphene having a size of less than 10 μm and an average thickness of 50 nm to 100 nm as a solid lubricant. In Example 2, graphite and graphene oxide were not included.

1-4. Coating Composition of Example 3

A coating composition for a wiper blade of Example 3 was prepared by mixing and dispersing 15 g of a polyurethane resin, 200 ml of toluene, and 10 g of each of graphene oxide and reduced graphene having a size of less than 10 μm and an average thickness of 50 nm to 100 nm as a solid lubricant. In Example 3, graphite was not included.

1-5. Coating Composition of Example 4

A coating composition for a wiper blade of Example 4 was prepared by mixing and dispersing 15 g of a polyurethane resin, 200 ml of toluene, and 16 g of graphene oxide and 4 g of reduced graphene each having a size of less than 10 μm and an average thickness of 50 nm to 100 nm as a solid lubricant. In Example 4, graphite was not included.

1-6. Coating Composition of Example 5

A coating composition for a wiper blade of Example 5 was prepared by mixing and dispersing 15 g of a polyurethane resin, 200 ml of toluene, and 4 g of graphene oxide and 16 g of reduced graphene each having a size of less than 10 μm and an average thickness of 50 nm to 100 nm as a solid lubricant. In Example 5, graphite was not included.

having a size of less than 1 μm and an average thickness of 1 nm to 1.2 nm as a solid lubricant. In Example 6, graphite and graphene oxide were not included.

2-2. Coating Composition of Example 7

A coating composition for a wiper blade of Example 7 was prepared by mixing and dispersing 15 g of a polyurethane resin, 200 ml of toluene, and 20 g of reduced graphene having a size of less than 5 μm and an average thickness of 50 nm to 100 nm as a solid lubricant. In Example 7, graphite and graphene oxide were not included.

2-3. Coating Composition of Example 8

A coating composition for a wiper blade of Example 8 was prepared by mixing and dispersing 15 g of a polyurethane resin, 200 ml of toluene, and 20 g of reduced graphene having a size of less than 10 μm and an average thickness of less than 1 nm as a solid lubricant. In Example 8, graphite and graphene oxide were not included.

2-4. Coating Composition of Example 9

A coating composition for a wiper blade of Example 9 was prepared by mixing and dispersing 15 g of a polyurethane resin, 200 ml of toluene, and 20 g of reduced graphene having a size of less than 10 μm and an average thickness of 50 nm to 100 nm as a solid lubricant. In Example 9, graphite and graphene oxide were not included.

2-5. Coating Composition of Example 10

A coating composition for a wiper blade of Example 10 was prepared by mixing and dispersing 15 g of a polyurethane resin, 200 ml of toluene, and 20 g of reduced graphene

TABLE 1

| | Classification | | Size (μm) | Average Thickness (Nm) | Comparative Example 1 | Example 1 | Example 2 | Example 3 | Example 4 | Example 5 |
|---|---|---|---|---|---|---|---|---|---|---|
| Binder | Polyurethane Resin (g) | | — | — | 15 | 15 | 15 | 15 | 15 | 15 |
| Solvent | Toluene (ml) | | — | — | 200 | 200 | 200 | 200 | 200 | 200 |
| | Graphite (g) | | 2.5 | — | 20 | | | | | |
| Solid Lubricant (g) | Graphene | Graphene Oxide | <10 | 50 to 100 | | | | 10 | 16 | 4 |
| | | Reduced Graphene | <10 | 50 to 100 | | | 20 | 10 | 4 | 16 |

2. Preparation of Coating Composition for Wiper Blade Comprising Reduced Graphene Coating compositions for a wiper blade of Comparative Example 1 and Examples 6 to 11 were prepared as follows according to the compositions shown in Table 2. The unit of the component content shown in Table 2 is g for the binder and the solid lubricant and is ml for the toluene.

2-1. Coating Composition of Example 6

A coating composition for a wiper blade of Example 6 was prepared by mixing and dispersing 15 g of a polyurethane resin, 200 ml of toluene, and 20 g of reduced graphene having a size of less than 14 μm and an average thickness of 10 nm to nm as a solid lubricant. In Example 10, graphite and graphene oxide were not included.

2-6. Coating Composition of Example 11

A coating composition for a wiper blade of Example 11 was prepared by mixing and dispersing 15 g of a polyurethane resin, 200 ml of toluene, and 20 g of reduced graphene having a size of less than 44 μm and an average thickness of 50 nm to 100 nm as a solid lubricant. In Example 11, graphite and graphene oxide were not included.

TABLE 2

| | Classification | Size (μm) | Average Thickness (Nm) | Comparative Example 1 | Example 6 | Example 7 | Example 8 | Example 9 | Example 10 | Example 11 |
|---|---|---|---|---|---|---|---|---|---|---|
| Binder | Polyurethane Resin (g) | — | — | 15 | 15 | 15 | 15 | 15 | 15 | 15 |
| Solvent | Toluene (ml) | — | — | 200 | 200 | 200 | 200 | 200 | 200 | 200 |
| Solid Lubricant | Graphite (g) | 2.5 | — | 20 | | | | | | |
| | Reduced Graphene (g) | <1 | 1 to 12 | | 20 | | | | | |
| | | <5 | 50 to 100 | | | 20 | | | | |
| | | <10 | <1 | | | | 20 | | | |
| | | <10 | 50 to 100 | | | | | 20 | | |

TABLE 2-continued

| Classification | Size (μm) | Average Thickness (Nm) | Comparative Example 1 | Example 6 | Example 7 | Example 8 | Example 9 | Example 10 | Example 11 |
|---|---|---|---|---|---|---|---|---|---|
| | <14 | 10 to 20 | | | | | | 20 | |
| | <44 | 50 to 100 | | | | | | | 20 |

3. Coating of Wiper Blade

Each of the coating compositions for a wiper blade was coated on a wiper blade using a spraying method as one of general coating methods.

The coating composition of the present disclosure was sprayed onto a surface of wiper blade rubber with a spray gun at a constant height, speed, and spray amount, and then, a coating film was cured through thermal curing (by a drying furnace) at room temperature.

Then, the following experiments were conducted to determine the durability, the abrasion resistance, and the slip property of the wiper blade.

Experimental Example 1. Measurement of Wiping Durability Grade

A tester based on a tester used for evaluating the performance of wiper blades as prescribed in JIS D5710 was used. The wiper blades were operated 500,000 cycles in a state where water was uniformly sprayed at 500 cc/min. The operating speed of the wiper blades was set to 40 cycle/min. The evaluation was carried out to determine wiping performance and the presence or absence of noise after performing the operations 100,000, 200,000, 300,000, and 500,000 cycles. In addition, the wiping performance was evaluated when the wiper blades were closed. In a case where vibrations of the wiper blades were significant and operations of the wiper blades were not smooth, the test was suspended. The evaluation reference table for wiping durability is as shown in Table 3 and FIG. 5.

TABLE 3

*Appendix 1: Evaluation Reference Table for Initial Wiping

| | | Objective Evaluation Definition | | |
|---|---|---|---|---|
| Grade | Range | Condition | Number of Lines | State of Wiped Line |
| 10 | — | — | — | None |
| 9 | 1/6 L | Discontinuous | 1 | Very fine lines ≤0.3 mm |
| 8 | 1/6 L | Discontinuous | Max.3 | Very fine lines ≤0.3 mm |
| | 1/6 L | Continuous | 1 | Very fine lines ≤0.3 mm |
| 7 | 1/6 L | Continuous | Max.3 | Very fine lines ≤0.3 mm |
| | 2/3 L | Discontinuous | 1 | Very fine lines ≤0.3 mm |
| 6 | 1/6 L | Continuous | Max.4 | Fine lines ≤1.0 mm |
| | 1/6 L and 2/3 L | Discontinuous | Max.12 | Very fine lines ≤0.3 mm |
| | 2/3 L | Continuous | 1 | Very fine lines ≤0.3 mm |
| 5 | 1/6 L | Continuous | Max.6 | Fine lines ≤1.0 mm |
| | 1/6 L and 2/3 L | Discontinuous | Max.20 | Very fine lines ≤0.3 mm |
| | 2/3 L | Continuous | Max.2 | Very fine lines ≤0.3 mm |
| 4 | 1/6 L and 2/3 L | Continuous | Many | ≤0.3 mm Even stripes with various widths, over 75% wiped of entire area |
| 3 | 1/6 L and 2/3 L | Continuous | Many | Grade 4 type lines, 2/3 L, concentrated and less than 75% wiped |
| 2 | 1/6 L and 2/3 L | Continuous | — | Formation of water film |
| | 1/6 L and 2/3 L | Continuous | — | Marks due to blade and elements |
| | 1/6 L and 2/3 L | Continuous | — | Occurrence of Hazing |
| 1 | 1/6 L and 2/3 L | Continuous | — | Evidence of Chattering |

Experimental Example 2. Measurement of Abrasion Resistance

An abrasion area of a cut surface at each of 5 points (Ⓐ to Ⓔ) of a wiper ES durable item was measured. The measurement data was measured with reference to FIG. 1 as the measurement area. The abrasion of the wiper blade durable item was evaluated based on 2,000 ($\mu m^2$). Referring to FIG. 1, the abrasion resistance was evaluated when the wiper blades were closed and opened. The abrasion resistance was calculated as (①×③)/2 when the wiper blades were closed, and the resistance abrasion was calculated as (②×④)/2 when the wiper blades were opened. During the test, in a case where vibrations of the wiper blades were significant and operations of the wiper blades were not smooth, the test was suspended.

Experimental Example 3. Measurement of Coefficient of Friction

In order to measure a coefficient of coating friction of the coating composition for a wiper blade, a coefficient of friction of a 100 mm rubber product was measured using an apparatus for measuring a coefficient of friction of FIG. 3. A pressing pressure for measuring a coefficient of friction was set to 12 g, a coefficient of friction was measured for 60 seconds, and an average value was confirmed.

In addition, the initial wiping grade measurement test, the wiping durability grade measurement test, the abrasion measurement test, and the coefficient of friction measurement test of the wiper blade obtained from the above Examples and Comparative Examples were conducted by the same methods as described above. The results thereof are shown in Tables 4 and 5.

TABLE 4

| Classification | Comparative Example 1 | Example 1 | Example 2 | Example 3 | Example 4 | Example 5 |
|---|---|---|---|---|---|---|
| Initial Wiping Grade | 10/10 | 10/10 | 10/10 | 10/10 | 10/10 | 10/10 |
| Wiping Durability Grade (200,000 cycles) | 7/7 | 8/8 | 8/8 | 8/8 | 8/8 | 8/8 |
| Abrasion | 3,558 | 1,555 | 1,644 | 1,598 | 1,582 | 1,608 |
| Coefficient of Friction | 0.410 | 0.379 | 0.377 | 0.378 | 0.381 | 0.380 |

As shown in Table 4, in the cases of the wiper blades manufactured using the coating compositions of Examples 1 to 5 comprising one or more of graphene oxide and reduced graphene, the wiping durability grade (200,000 cycles) was excellent, and the abrasion and the coefficient of friction were low, in comparison to Comparative Example 1 in which graphite was included.

In Examples 1 to 5, the size and the average thickness of the graphene oxide were less than 10 μm and 50 nm to 100 nm, respectively, and the size and the average thickness of the reduced graphene were less than 10 μm and 50 nm to 100 nm, respectively.

The coating composition for a wiper blade of Example 1 was prepared by mixing and dispersing 15 g of a polyurethane resin, 200 ml of toluene, and 20 g of graphene oxide without comprising graphite and reduced graphene, and in the case of the wiper blade manufactured using the coating composition, the wiping durability grade (200,000 cycles) was 8/8, and the abrasion was 1,555, which was lower than those in Comparative Example 1 and Examples 2 to 5 and 11. The coefficient of friction was 0.379, which was lower than those in Comparative Example 1 and Examples 4, 5, and 11.

The coating composition for a wiper blade of Example 2 was prepared by mixing and dispersing 15 g of a polyurethane resin, 200 ml of toluene, and 20 g of reduced graphene without comprising graphite and graphene oxide, and in the case of the wiper blade manufactured using the coating composition, the wiping durability grade (200,000 cycles) was 8/8, and the abrasion was 1,644, which was lower than those in Comparative Example 1 and Example 11. The coefficient of friction was 0.377, which was lower than those in Comparative Example 1 and Examples 1, 3 to 5, and 11.

The coating composition for a wiper blade of Example 3 was prepared by mixing and dispersing 15 g of a polyurethane resin, 200 ml of toluene, and 10 g of each of graphene oxide and reduced graphene without comprising graphite, and in the case of the wiper blade manufactured using the coating composition, the wiping durability grade (200,000 cycles) was 8/8, and the abrasion was 1,598, which was lower than those in Comparative Example 1 and Examples 2, 5, and 11. The coefficient of friction was 0.378, which was lower than those in Comparative Example 1 and Examples 1, 4, 5, and 11.

The coating composition for a wiper blade of Example 4 was prepared by mixing and dispersing 15 g of a polyurethane resin, 200 ml of toluene, 16 g of graphene oxide, and 4 g of reduced graphene without comprising graphite, and in the case of the wiper blade manufactured using the coating composition, the wiping durability grade (200,000 cycles) was 8/8, and the abrasion was 1,582, which was lower than those in Comparative Example 1 and Examples 2, 3, 5, and 11. The coefficient of friction was 0.381, which was lower than that in Comparative Example 1.

The coating composition for a wiper blade of Example 5 was prepared by mixing and dispersing 15 g of a polyurethane resin, 200 ml of toluene, 4 g of graphene oxide, and 16 g of reduced graphene without comprising graphite, and in the case of the wiper blade manufactured using the coating composition, the wiping durability grade (200,000 cycles) was 8/8, and the abrasion was 1,608, which was lower than those in Comparative Example 1 and Examples 2 and 11. The coefficient of friction was 0.380, which was lower than those in Comparative Example 1 and Example 4.

TABLE 5

| Classification | Comparative Example 1 | Example 6 | Example 7 | Example 8 | Example 9 | Example 10 | Example 11 |
|---|---|---|---|---|---|---|---|
| Initial Wiping Grade | 10/10 | 10/10 | 10/10 | 10/10 | 10/10 | 10/10 | 10/10 |
| Wiping Durability Grade (200,000 cycles) | 7/7 | 8/8 | 9/9 | 9/8 | 9/8 | 8/9 | 8/8 |
| Abrasion | 3,558 | 1,555 | 807 | 1,067 | 1,207 | 952 | 2,031 |
| Coefficient of Friction | 0.410 | 0.377 | 0.335 | 0.345 | 0.372 | 0.340 | 0.380 |

As shown in Table 5, in the cases of the wiper blades manufactured using the coating compositions of Examples 6 to 11 comprising reduced graphene, the wiping durability grade (200,000 cycles) was excellent, and the abrasion and the coefficient of friction were low, in comparison to Comparative Example 1 in which graphene was not included and graphite was included.

The coating composition for a wiper blade of Example 6 was prepared by mixing and dispersing 15 g of a polyurethane resin, 200 ml of toluene, and 20 g of reduced graphene having a size of less than 1 μm and an average thickness of 1 nm to 1.2 nm without comprising graphite and graphene oxide, and in the case of the wiper blade manufactured using the coating composition, the wiping durability grade (200,000 cycles) was 8/8, and the abrasion was 1,555, which was lower than those in Comparative Example 1 and Examples 2 to 5 and 11. The coefficient of friction was 0.377, which was lower than those in Comparative Example 1 and Examples 2 to 5 and 11.

The coating composition for a wiper blade of Example 7 was prepared by mixing and dispersing 15 g of a polyurethane resin, 200 ml of toluene, and 20 g of reduced graphene having a size of less than 5 μm and an average thickness of 50 nm to 100 nm without comprising graphite and graphene oxide, and in the case of the wiper blade manufactured using the coating composition, the wiping durability grade (200,000 cycles) was 9/9, and the abrasion was 807, which was lower than those in Comparative Example 1 and Examples 1 to 6 and 8 to 11. The coefficient of friction was 0.335, which was lower than those in Comparative Example 1 and Examples 1 to 6 and 8 to 11.

The coating composition for a wiper blade of Example 8 was prepared by mixing and dispersing 15 g of a polyurethane resin, 200 ml of toluene, and 20 g of reduced graphene having a size of less than 10 μm and an average thickness of less than 1 nm without comprising graphite and graphene oxide, and in the case of the wiper blade manufactured using the coating composition, the wiping durability grade (200,000 cycles) was 9/8, and the abrasion was 1,067, which was lower than those in Comparative Example 1 and Examples 1 to 6, 9, and 11. The coefficient of friction was 0.345, which was lower than those in Comparative Example 1 and Examples 1 to 6, 9, and 11.

The coating composition for a wiper blade of Example 9 was prepared by mixing and dispersing 15 g of a polyurethane resin, 200 ml of toluene, and 20 g of reduced graphene having a size of less than 10 μm and an average thickness of 50 nm to 100 nm without comprising graphite and graphene oxide, and in the case of the wiper blade manufactured using the coating composition, the wiping durability grade (200,000 cycles) was 9/8, and the abrasion was 1,207, which was lower than those in Comparative Example 1 and Examples 1 to 6 and 11. The coefficient of friction was 0.372, which was lower than those in Comparative Example 1 and Examples 1 to 6 and 11.

The coating composition for a wiper blade of Example 10 was prepared by mixing and dispersing 15 g of a polyurethane resin, 200 ml of toluene, and 20 g of reduced graphene having a size of less than 14 μm and an average thickness of 10 nm to 20 nm without comprising graphite and graphene oxide, and in the case of the wiper blade manufactured using the coating composition, the wiping durability grade (200,000 cycles) was 8/9, and the abrasion was 952, which was lower than those in Comparative Example 1 and Examples 1 to 6, 8, 9, and 11. The coefficient of friction was 0.340, which was lower than those in Comparative Example 1 and Examples 1 to 6, 8, 9, and 11.

The coating composition for a wiper blade of Example 11 was prepared by mixing and dispersing 15 g of a polyurethane resin, 200 ml of toluene, and 20 g of reduced graphene having a size of less than 44 μm and an average thickness of 50 nm to 100 nm without comprising graphite and graphene oxide, and in the case of the wiper blade manufactured using the coating composition, the wiping durability grade (200,000 cycles) was 8/8, and the abrasion was 2,031, which was lower than that in Comparative Example 1. The coefficient of friction was 0.380, which was lower than those in Comparative Example 1 and Example 4.

Hereinabove, specific portions of the present disclosure have been described in detail, but it will be obvious to those skilled in the art that this detailed description is only a preferred embodiment and the scope of the present disclosure is not limited by this detailed description. Therefore, the substantial scope of the present disclosure will be defined by the accompanying claims and equivalents thereof.

What is claimed:

1. A coating composition for a wiper blade comprising graphene, the coating composition comprising a solid lubricant comprising one or more types of graphene selected from graphene oxide and reduced graphene,
   wherein the coating composition comprises 1 to 10 parts by weight of a binder based on 100 parts by weight of the coating composition.

2. The coating composition of claim 1, wherein a size of the graphene is 50 μm or less.

3. The coating composition of claim 1, wherein an average thickness of the graphene is 0.5 nm to 100 nm.

4. The coating composition of claim 3, wherein the average thickness of the graphene is 50 nm to 100 nm.

5. The coating composition of claim 1, wherein a weight ratio of the reduced graphene to the graphene oxide is 1:0 to 1:4.

6. The coating composition of claim 1, wherein the solid lubricant comprises reduced graphene.

7. The coating composition of claim 1, wherein the reduced graphene is a powder form.

8. The coating composition of claim 1, wherein the coating composition comprises, based on 100 parts by weight of the coating composition for a wiper blade:
   1 to 16 parts by weight of a solid lubricant;
   1 to 10 parts by weight of a binder; and
   80 to 90 parts by weight of an organic solvent.

9. The coating composition of claim 1, wherein the coating composition improves slip property, abrasion resistance, and durability of a nonmetal material of said wiper blade in comparison to a coating composition for a wiper blade that does not comprise graphene.

10. A wiper blade coated with a coating composition,
    wherein the coating composition comprises a solid lubricant comprising one or more types of graphene selected from graphene oxide and reduced graphene, and
    wherein the coating composition comprises 1 to 10 parts by weight of a binder based on 100 parts by weight of the coating composition.

11. A method for manufacturing a wiper blade, the method comprising coating a coating composition on a wiper blade,
    wherein the coating composition comprises a solid lubricant comprising one or more types of graphene selected from graphene oxide and reduced graphene; and
    wherein the coating composition comprises 1 to 10 parts by weight of a binder based on 100 parts by weight of the coating composition.

12. The coating composition of claim 1, wherein the binder comprises a polyurethane resin.

13. The coating composition of claim 1, wherein the binder comprises a silicone-based binder.

* * * * *